United States Patent
Liao

(10) Patent No.: US 8,698,403 B2
(45) Date of Patent: Apr. 15, 2014

(54) ELECTRIC PROTECTION MECHANISM FOR LIGHT CONTROLLER

(75) Inventor: Yin-Sheng Liao, Taichung (TW)

(73) Assignee: Rhine Electronic Co., Ltd., Taichung (TW)

( * ) Notice: Subject to any disclaimer, the term of this patent is extended or adjusted under 35 U.S.C. 154(b) by 170 days.

(21) Appl. No.: 13/468,137

(22) Filed: May 10, 2012

(65) Prior Publication Data

US 2013/0300291 A1  Nov. 14, 2013

(51) Int. Cl.
*H05B 37/00* (2006.01)
*G05F 1/46* (2006.01)

(52) U.S. Cl.
USPC ........... 315/119; 315/289; 315/290; 315/302; 323/284; 323/282

(58) Field of Classification Search
USPC ......... 361/93.7–93.9; 323/284, 288; 315/289, 315/290, 291, 302
See application file for complete search history.

(56) References Cited

U.S. PATENT DOCUMENTS

| | | | | |
|---|---|---|---|---|
| 8,179,651 | B2 * | 5/2012 | Fanic | 361/93.9 |
| 8,310,166 | B2 * | 11/2012 | Nagaoka | 315/209 R |
| 8,319,482 | B2 * | 11/2012 | Matsuo et al. | 323/224 |
| 2010/0164460 | A1 * | 7/2010 | Hsiao et al. | 323/284 |
| 2013/0033248 | A1 * | 2/2013 | Granger | 323/288 |

* cited by examiner

Primary Examiner — Vibol Tan
(74) Attorney, Agent, or Firm — Ming Chow; Sinorica, LLC

(57) ABSTRACT

An electric protection mechanism for a light controller includes an overload protection device. The overload protection device includes a lamplight controller, a power controller, and a load detector. A current sensor is provided between the power controller and a light. An overload detector is provided to detect the state of the electric current anytime. Once abnormal current is outputted to the light, the power controller immediately shuts its output and informs the lamplight controller of the abnormal current. The lamplight controller will reset its process, such as to shut down the power source or to press the button so as to return to normal. Thus, the lamplight controller, a light adjuster or a remote controller can be protected. The present invention provides an overload protection function, and it is safe to use the present invention.

3 Claims, 3 Drawing Sheets

ELECTRIC PROTECTION MECHANISM FOR LIGHT CONTROLLER

BACKGROUND OF THE INVENTION

1. Field of the Invention

The present invention relates to an electric protection mechanism for a light controller, and more particularly, to a light overload protection mechanism.

2. Description of the Prior Art

As shown in FIG. 3, a conventional light controller comprises a light control device (50). A power source (20) is guided to the light control device (50) through a power controller (51). The light control device (50) uses the power controller (51) cooperating with a light controller (52) to turn on/off a light (40) or to adjust the brightness of the light (40) through a press-button or remote-controlled system (53). The load condition is not monitored, so it has the following shortcomings.

1. Bad overload protection: The abnormal burning of the light will result in over current to damage the controller or the light adjustor, so the overload protection effect is bad.

2. Not safe for use: The abnormal burning of the light will result in over current to damage the controller or the light adjustor or to cause an accident. It is not safe to use the light controller.

Accordingly, the present invention intends to provide a multi-functional bag for improving the shortcomings mentioned above.

SUMMARY OF THE INVENTION

The primary object of the present invention is to provide an electric protection mechanism for a light controller. The electric protection mechanism comprises an overload protection device. The overload protection device comprises a lamplight controller, a power controller, and a load detector. A current sensor is provided between the power controller and a light. An overload detector is provided to detect the state of the electric current anytime. Once abnormal current is outputted to the light, the power controller immediately shuts its output and informs the lamplight controller of the abnormal current. The lamplight controller will reset its process, such as to shut down the power source or to press the button so as to return to normal. In this way, the lamplight controller, a light adjuster or a remote controller can be protected, preventing them from burning because of a short circuit to generate over current to burn down the lamplight controller, the light adjuster or the remote controller. The present invention provides an overload protection function, and it is safe to use the present invention.

DETAILED DESCRIPTION OF THE PREFERRED EMBODIMENTS

Embodiments of the present invention will now be described, by way of example only, with reference to the accompanying drawings.

Figure 1:
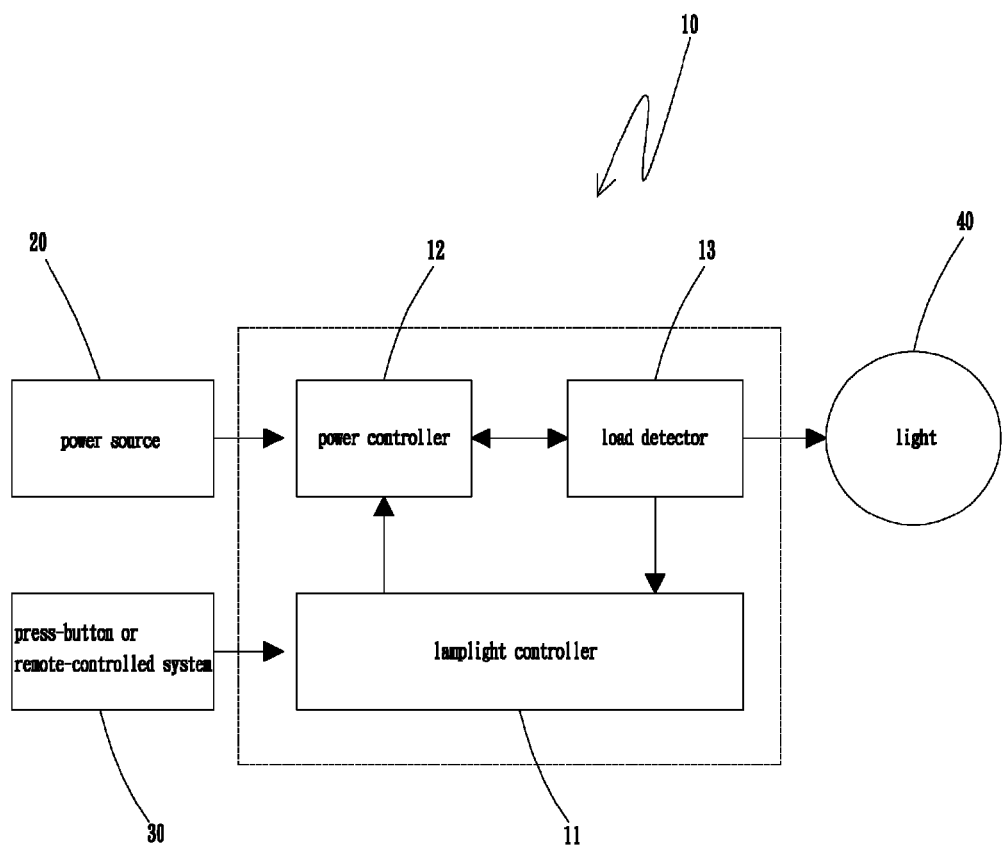
FIG. 1 is a diagram according to a preferred embodiment of the present invention.
Figure 2:
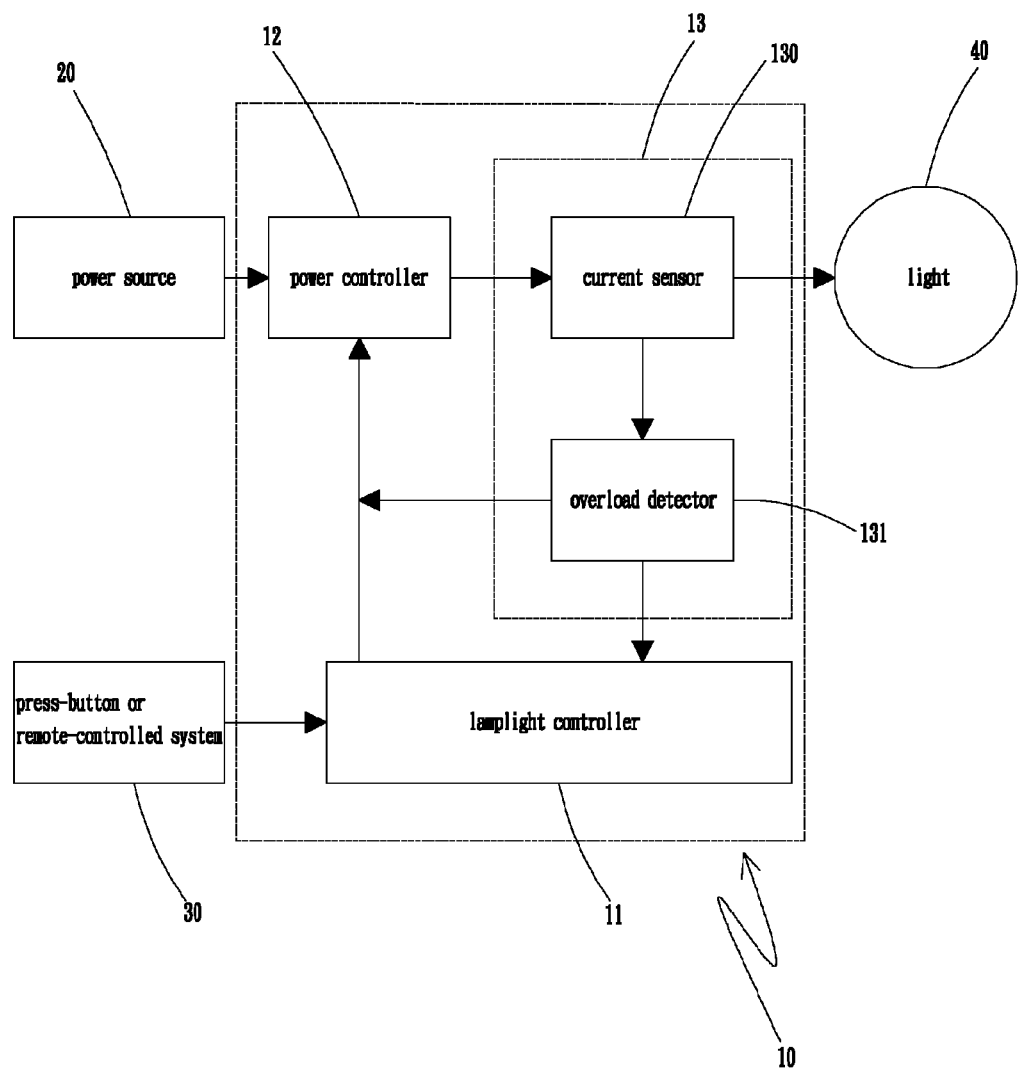
FIG. 2 is a further detailed diagram according to a preferred embodiment of the present invention.
Figure 3:
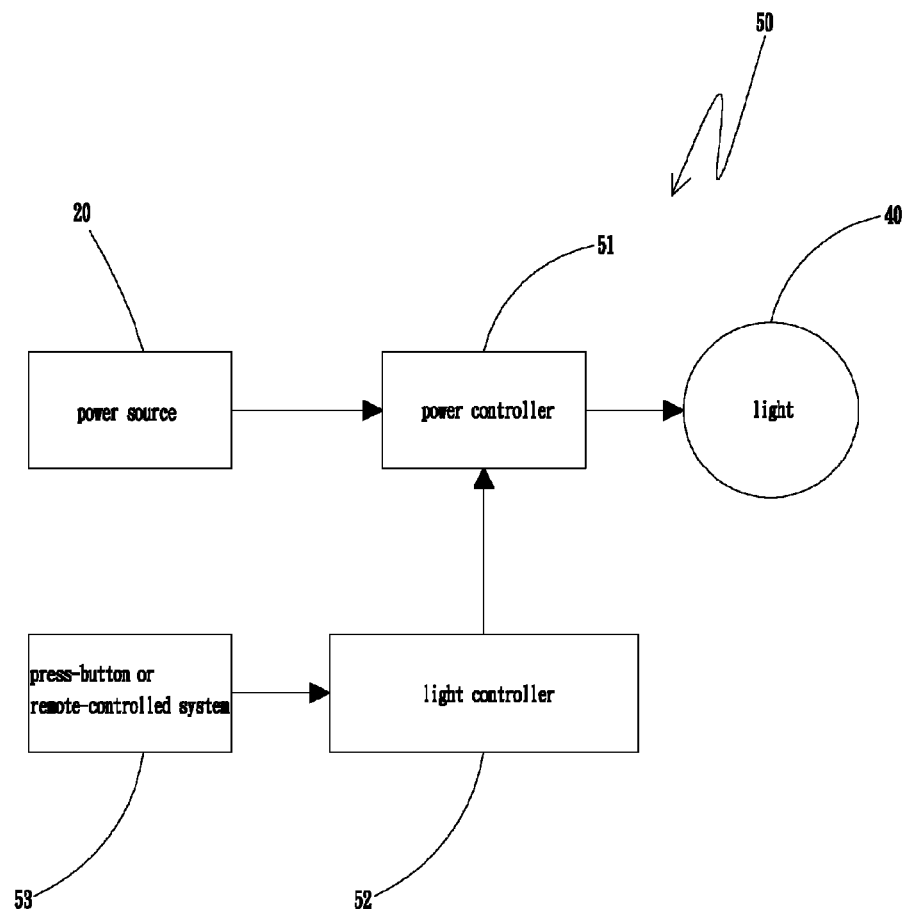
FIG. 3 is a diagram of a conventional light controller.

As shown in FIG. 1 and FIG. 2, the electric protection mechanism for a light controller according to a preferred embodiment of the present invention comprises an overload protection device (10), a power source (20), a press-button or remote-controlled system (30), and a light (40).

The overload protection device (10) comprises a lamplight controller (11), a power controller (12), and a load detector (13). The load detector (13) comprises a current sensor (130) and an overload detector (131). The lamplight controller (11) is connected with the power controller (12). The power controller (12) is connected with the current sensor (130) of the load detector (13). The current sensor (130) is connected with the overload detector (131). The overload detector (131) is connected with the lamplight controller (11) and the power controller (12), respectively.

The power source (20) is connected with the power controller (12) of the overload protection device (10).

The press-button or remote-controlled system (30) is connected with the lamplight controller (11) of the overload protection device (10).

The light (40) is connected with the current sensor (130) of the load detector (13) of the overload protection device (10).

Referring to FIG. 1 and FIG. 2, the lamplight controller (11) is connected with the power controller (12). The power controller (12) is connected with the current sensor (130) of the load detector (13). The current sensor (130) is connected with the overload detector (131). The overload detector (131) is connected with the lamplight controller (11) and the power controller (12), respectively. The power controller (12) is connected with the power source (20). The lamplight controller (11) is connected with the press-button or remote-controlled system (30). The current sensor (130) of the load detector (13) is connected with the light (40). The current sensor (130) is disposed between the power controller (12) and the light, and the overload detector (131) detects the state of the electric current anytime. Once abnormal current is outputted to the light, the power controller (12) immediately shuts its output and informs the lamplight controller (11) of the abnormal current. The lamplight controller (11) will reset its process, such as to shut down the power source or to press the button so as to return to normal. Thus, the lamplight controller (11), a light adjuster or a remote controller can be protected, preventing them from burning because of a short circuit to generate over current to burn down the lamplight controller (11), the light adjuster or the remote controller. The present invention provides an overload protection function, and it is safe to use the present invention.

The present invention has the following advantages:

1. Providing an overload protection function: The current sensor is disposed between the power controller and the light, and the overload detector detects the state of the electric current anytime. Once abnormal current is outputted to the light, the power controller immediately shuts its output and informs the lamplight controller of the abnormal current. The lamplight controller will reset its process, such as to shut down the power source or to press the button so as to return to normal. The present invention provides an overload protection function.

2. Providing a safe use. The current sensor is disposed between the power controller and the light, and the overload detector detects the state of the electric current anytime. Once abnormal current is outputted to the light, the power controller immediately shuts its output and informs the lamplight controller of the abnormal current. The lamplight controller will reset its process. The lamplight controller, the light adjuster or the remote controller can be protected, preventing them from burning because of a short circuit to generate over current to burn down the lamplight controller, the light adjuster or the remote controller. It is safe to use the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An electric protection mechanism for a light controller, comprising:
   an overload protection device;
   the overload protection device comprising a lamplight controller, a power controller and a load detector;
   the lamplight controller being connected with the power controller;
   the power controller being connected with the load detector;
   the load detector comprises a current sensor and an overload detector;
   the current sensor being connected with the power controller, and being further connected with the overload detector; and
   the overload detector being connected with the lamplight controller and the power controller, respectively.

2. An electric protection mechanism for a light controller, comprising:
   an overload protection device, the overload protection device comprising a lamplight controller, a power controller and a load detector, the lamplight controller being connected with the power controller, the power controller being connected with the load detector;
   a power source, the power source being connected with the power controller of the overload protection device;
   a press-button or remote-controlled system, the press-button or remote-controlled system being connected with the lamplight controller of the overload protection device; and
   a light, the light being connected with the load detector of the overload protection device.

3. The electric protection mechanism for a light controller as claimed in claim 2, wherein the load detector comprises a current sensor and an overload detector, the current sensor being connected with the power controller, the current sensor being further connected with the overload detector, the overload detector being connected with the lamplight controller and the power controller, respectively.

* * * * *